Feb. 24, 1970   H. BOLZMANN ET AL   3,497,867
SONAR METHOD AND APPARATUS FOR RECORDING
REFLECTORS, FOR EXAMPLE SCHOOLS OF FISH
Filed Feb. 3, 1966   3 Sheets-Sheet 3

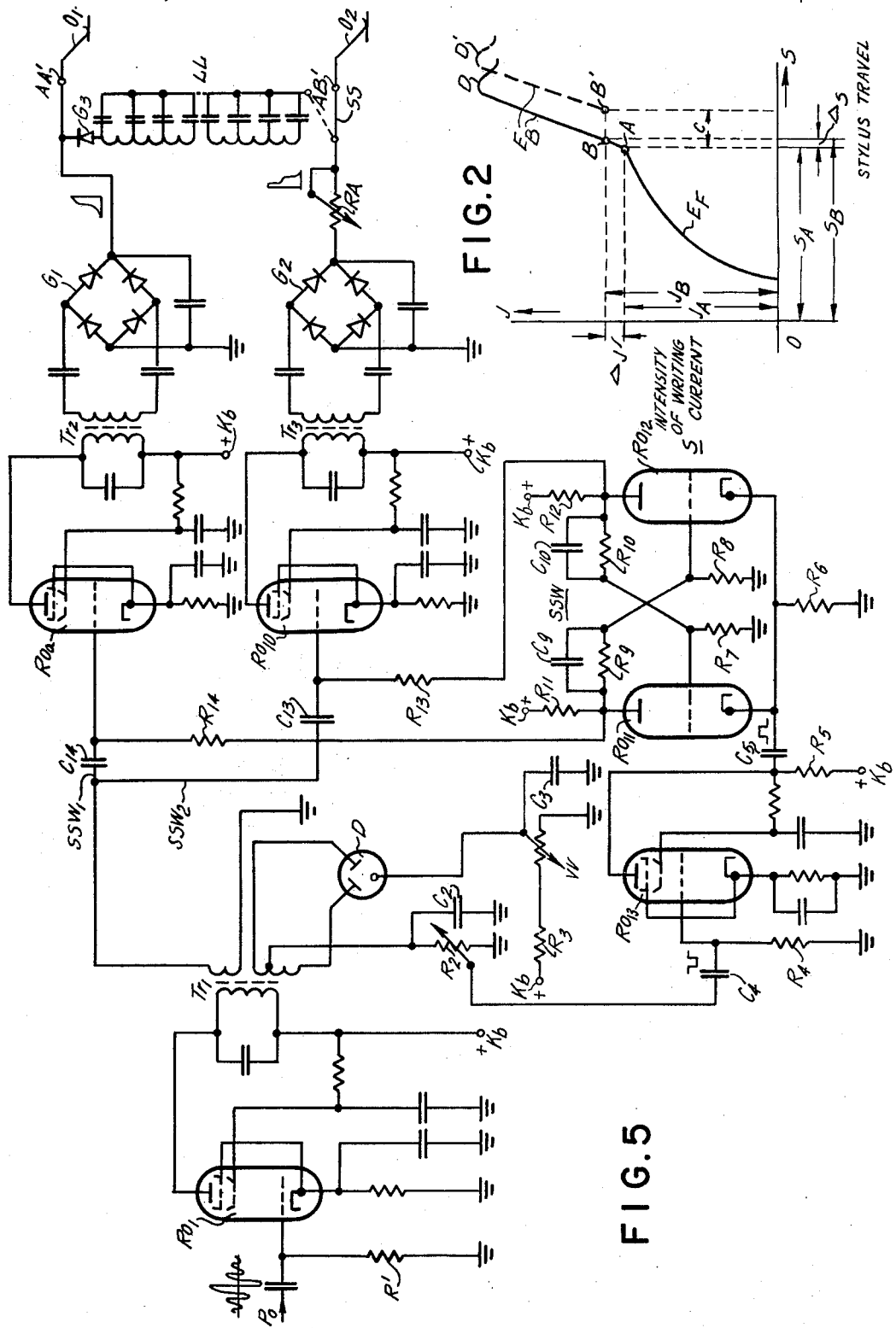

3,497,867
SONAR METHOD AND APPARATUS FOR RECORDING REFLECTORS, FOR EXAMPLE SCHOOLS OF FISH
Hans Bolzmann and Walter Kriebel, Kiel, Germany, assignors to Electroacustic Gesellschaft mit beschrankter Haftung, Kiel, Germany, a German corporation
Filed Feb. 3, 1966, Ser. No. 524,772
Int. Cl. G01s 9/66
U.S. Cl. 340—3     12 Claims

ABSTRACT OF THE DISCLOSURE

Sonar apparatus for detecting fish or other reflecting objects close to the bottom of the sea records fish echos in a first portion of the echogram via a first recording stylus. When the bottom echo pulse is received, a time delay is initiated in the echogram and the recording operation is switched to a second recording stylus which records the sea-bottom echo pulses in a second portion of the echogram. The first and second portions of the echogram are thus spaced from each other by a white separation interval which clearly distinguishes the bottom and fish echoes without interruption or loss of information of any received echo pulses.

---

Our invention relates to sonar methods and apparatus for recording schools of fish or other reflectors as distinct from the sea bottom close to which such reflectors may be located.

There are known methods and apparatus of this type that are designed to reduce recording errors due to vertical motion of the sonar-equipped vessel in rough sea. These methods derive from such vertical motion the control magnitudes employed for minimizing or eliminating the otherwise resulting disturbances in the sonar recordings. Another purpose of these methods is to afford recording a clear echogram when the vessel travels over a greatly uneven sea bottom. To this end, the zero point of the recording is subjected to displacement, preferably in a measurable manner, or the scale of recording is varied, in dependence upon the recurrent receiving moment of the bottom echo, so that the sequence of bottom echoes on the record carrier, such as the chart paper of a recording instrument, exhibits an echo curve in the form of a straight line perpendicular to the movement of the recording stylus. In this manner, an attempt is made to achieve a clear separation, for example of recorded fish echoes from a recorded echo of the sea bottom. However, the regulating deivce is very sluggish since the record carrier inclusive of the paper guiding rollers must be shifted for performing the regulating operation, and this prevents the fish echoes from being clearly separated from the sea bottom echoes.

There are also methods and apparatus for recording sonar echoes on electrically sensitive paper. These permit securing an improved distinctiveness between achoes of respectively different intensities, such as by reducing the blackening of the paper caused by the bottom echo. The bottom echo is only partially recorded with a reduced writing-current intensity, so that the echogram shows the bottom echo as a black line having a varying width along its course or as a black line of constant width.

Another way of electrically recording sonar echoes is to record the fish echoes in dark gray shade and to superimpose thereupon a bottom echo in a lighter shade than the fish echoes. In such an echogram the bottom echo is only blurringly distinct from the recordings of fish echoes, since the recording of the bottom echo differs from the dark gray recording, for example of fish close to the sea bottom, only by a shading of light gray to white appearance.

This kind of recording operation is further disadvantageous in being predicated upon a series-opposition of two voltages derived from the output of the echo signal amplifier. One of these voltages may increase during the recording opeartion up to a "dark gray" value, whereas the other voltage may increase up to "black" values derived from the peaks of the bottom echoes. A light or white writing on the bottom echo, however, takes place only when the voltage of the bottom echo peak is equal to, or lower than, the other voltage which may increase up to a dark gray value. If the voltage from the bottom echo peak is higher than the dark-gray value voltage, then a more or less intensive blackening occurs; that is, the fish echoes, written dark gray in the echogram are not followed by a light or white interruption, but are directly bordered by a more or less blackened recording of the bottom echo.

This is obviated in a recording system which derives a control pulse from the bottom echo pulse and causes the control pulse to act upon the bottom echo with the reversed polarity after some time delay in such a manner that only the leading flank of the bottom echo is recorded black, whereas the remaining portion of the bottom echo is not recorded.

In a modification of the last-mentioned system, the leading flank of the bottom echo pulse being recorded serves to initiate the switching operation of a monostable multivibrator which interrupts the recording operation a given constant interval of time so that a uniformly white and bare strip will appear on the echogram chart in parallel relation to the black bottom-echo line.

All of these recording methods and apparatus destroy to a larger or lesser extent some of the information content of the bottom echo, although such information is useful for determining from the echogram the constitution or configuration of the sea bottom. Furthermore, when these recording methods and apparatus are being used on rough sea, the upward and downward motion of the vessel carrying the sonar equipment cause the fish echo recordings to be more or less covered and obscured by the recording of the bottom echo, especially if the sea bottom is greatly uneven. Under such circumstances, a clear separation of the two echo recordings is impossible.

Further known is a recording method which aims at obtaining an echogram without loss of information content and permits comparing the recordings stemming from fish closely above the sea bottom with recordings indicative of only fish near the sea bottom without showing the bottom This method, however, requires providing two recording instruments with respective styli of which one records only fish near these a bottom without showing the bottom itself, whereas the second recording instrument exhibits the entire echogram of any fish and the sea bottom.

These two recordings can also be produced on a single recording instrument by first producing a recording of fish and sea bottom, and thereafter producing on the same chart a second recording which exhibits only the fish at a given distance from the first recording. Although this avoids loss of information content in the recording of the sea bottom, no information content is available in the echogram at those localities where the additional recording of fish has taken place. A comparison of the two mutually spaced and sequentially produced recordings is not readily possible, unless the sea bottom is exhibited by pulse markings in the second recording; but such pulse markings are hardly distinct from the recording of the sea bottom and require a considerable amount of costly equipment as well as an increased consumption of current-sensitive chart paper.

There is also a method for recording the echoes of fish close to the sea bottom but distinguished from the bottom echo by representing the sea bottom in raster fashion on the chart paper. This is achieved by having in the echogram normal recordings alternate in equal intervals of time with record portions in which the writing operation is interrupted by the bottom echo. In this case only some of the information content is lost in the echogram, but the loss is not appreciable because a conclusion as to the constitution of the sea bottom can be gained from a comparison of the recorded parts of the bottom echo with the parts omitted in the echogram.

It is an object of the present invention to provide a sonar method and apparatus for recording reflectors, for example schools of fish located close to the sea bottom, that eliminates or greatly minimizes the disadvantages of the above-mentioned known recording methods and systems.

According to our invention, we derive a control magnitude, preferably an electric voltage, from a high-intensity echo, such as the echo from the sea bottom, as distinct from the weaker echoes such as those reflected from schools of fish, and we apply this control voltage to the recording operation for distinguishing the recordings of reflectors, for example of fish, from the sea bottom. In conjunction therewith, it is further essential to our invention that the recording of the echogram without loss of information content is performed in two portions which are spaced from each other a constant distance, on the same chart, the necessary displacement between the two echogram portions being effected in dependence upon the strongest echo, for example the sea bottom echo, and controlled by the above-mentioned control voltage. This displacement is either effected abruptly upon occurrence of the strongest echo, or it may take place upon lapse of a given interval of time from the occurrence of the strongest echo.

According to another feature of our invention, the recording of the bottom echo in one portion of the echogram beneath the recording of the reflectors located closely above the bottom, is variable in accordance with the motion of the sonar-equipped vessel in rough sea.

The invention will be further described with reference to embodiments illustrated by way of example in the accompanying drawings.

FIG. 2 is an explanatory graph relating to the echogram of FIG. 1 and to the embodiments of apparatus shown in FIGS. 3a to 5;

FIG. 5 is the circuit diagram of still another embodiment of a recording system according to the invention.

Figure 1:
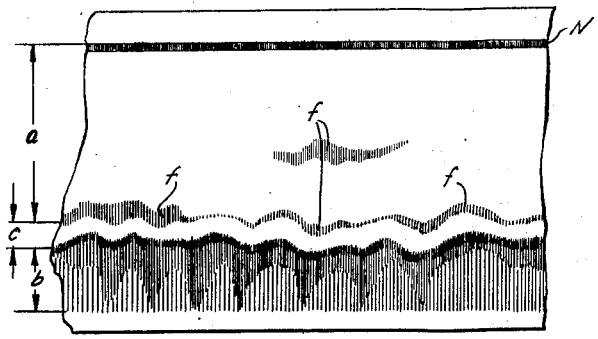
FIG. 1 shows schematically a typical echogram obtainable with the method and apparatus according to the invention.

Referring to the echogram illustrated in FIG. 1, the recorded horizontal line N denotes the zero sound serving as a locus of reference. Various recordings of schools of fish appear at $f$. Exhibited beneath the fish recordings is the bottom echo. It will be seen that the recordings of the bottom echo in range $b$ is shifted downward from the recording range $a$ of the fish echoes a constant distance $c$ and that the shift does not result in any appreciable loss of information content as far as the recorded bottom echo is concerned. When reading the depth of the sea bottom beneath the surface N, the amount $c$ of shift must be deducted from the measured depth in the echogram in order to obtain the true depth, if the bottom echo is not recorded in the range $a$.

The method of the invention also affords recording the echo of the sea bottom directly beneath the lowermost school of fish. In this case, the amount of shift $c$ need not be deducted from the echogram.

With the method of the present invention, the recording of the sea bottom, which in the known method is represented beneath the school of fish by a dark strip or line of larger or smaller width, can be eliminated down to a negligible amount, as will be set forth presently with further reference to FIG. 1.

The white separating strip or line which appears immediately beneath the lowermost echo recordings $f$ of fish clearly separates the normal recording of schools of fish (range $a$ in FIG. 1) from the subsequent normal recordings of the sea bottom (range $b$ in FIG. 1); but the strip does not involve a loss of information in contrast to the known recording method in which the white separating strip or line on the echogram inevitably constitutes such loss. With the method of the invention, no superposition of the bottom echo upon echoes stemming from fish closely above the sea bottom can occur, since the bottom echo recording (range $a$ in FIG. 1) can be reduced down to a magnitude too small to ever overlap the recorded fish echoes.

The recording method of the invention would readily permit reducing the bottom echo recording down to zero (in part $a$ of the echogram, FIG. 1). This, however, is not desirable because it would make it impossible to directly read off the depth of the bottom of echogram localities where no reflector echoes close to the bottom are recorded.

The following numerical example will further elucidate the invention.

Echo soundings are to be recorded in a depth of 75 m., using an echograph having a chart width of 180 mm. Sound traveling in water down to a depth of 75 m. requires a time of $\frac{1}{10}$ second between issuance of the transmitter pulse and reception of the echo pulse reflected from the sea bottom. The speed of the recording stylus in this case is 180 mm. in $\frac{1}{10}$ second, assuming that the zero sound is recorded at zero mm. and the bottom echo is recorded at 180 mm. At this stylus speed, the stylus would write a line of 18 mm. length in $\frac{1}{100}$ second if the stylus is traversed by electric current during this interval of time. In $\frac{1}{1000}$ sec. (1 ms.), the line would have a length of 1.8 mm.; in $\frac{1}{10,000}$ sec. (100 $\mu$s.), the line would be 0.18 mm. long, and in 10 $\mu$s. its length would be 0.018 mm. The last-mentioned value, written upon the current-sensitive chart paper, would hardly be visible. Furthermore, this paper has some inertia as to its recording performance.

In the method according to the invention, the just-mentioned recognition may be utilized by interrupting the recording of the echogram for a short interval of time, for example 10 $\mu$s., and consequently without appreciable or noticeable loss of information content, with the result that the recording takes place in two portions separated from each other by the constant distance $c$ exemplified by the echogram of FIG. 1. As explained, the shifting of the second recording portion $b$ relative to the first portion $a$ by the amount $c$ is controlled by the strongest echo, preferably the bottom echo.

One way of doing this is to have the reflector echoes, for example fish echoes, recorded in the first portion $a$ of the echogram with the aid of a first recording stylus, whereupon the bottom echo, when its intensity exceeds an adjustable threshold value, causes a switching device to switch the operation, for example after 10 $\mu$s., to a second recording stylus in order to record the second portion $b$ (FIG. 1) of the echogram, the second recording stylus being spaced from the first stylus the distance $c$ and continuing the recording performance on the track of the first stylus.

Before describing such a recording device it will be helpful to further elucidate the stylus switching method with reference to the graph shown in FIG. 2. The abscissa denotes stylus travel S. The ordinate denotes the intensity of the writing current J supplied to the styli and the electrically responsive chart paper of the recording instrument. From point O to point A the current passing through the first stylus produces a record of fish echoes corresponding to curve portion $E_F$. From A to B, the recorder writes the bottom echo corresponding to the curve portion $E_B$. When the writing current exceeds the threshold value $J_A$, the writing operation is interrupted for an interval of time $\Delta T$, for example 10 $\mu$s. The travel distance $\Delta S$ traversed during this interval is 0.018 mm. on the recording chart having the width of 180 mm. mentioned in the foregoing. During the same interval, the current increases by the amount $\Delta J$, so that point B of the curve is reached. Beyond point B, the bottom echo $E_B$ is not further recorded during the subsequent travel $\Delta S$. Instead, the bottom-echo recording is shifted by the amount $c$ so as to continue from point B'. Thenceforth, the recorded bottom echo corresponds to the curve portion B'–D'. The first stylus ceases to write at point A. The second stylus, displaced by the amount $c$ from the first, commences to continue the recording operation at B'.

A second way to continue the recording of curve portion $E_B$ from point B' is the following: Only one stylus is used. The writing operation of this stylus is interrupted at point A. At this point, a delay member, for example a time delay chain network, is interposed into the writing circuit for delaying the travel time of the writing-current pulses. After elapse of the delay time $T_c$, the writing-current pulses appear without appreciable loss of information content and again pass from the writing stylus through the electrically sensitive paper, thus blackening the paper. In the meantime the writing stylus has moved the distance $c$ during which no writing operation has taken place.

The time-delay network will have to be given a time delay of 1 ms. for a distance $c=1.8$ mm., when operating according to the last mode with a recording depth range of 0 to 75 m., using an echograph whose chart paper has an effective width of 180 mm. corresponding to the numerical example given in the foregoing.

Figure 3A:
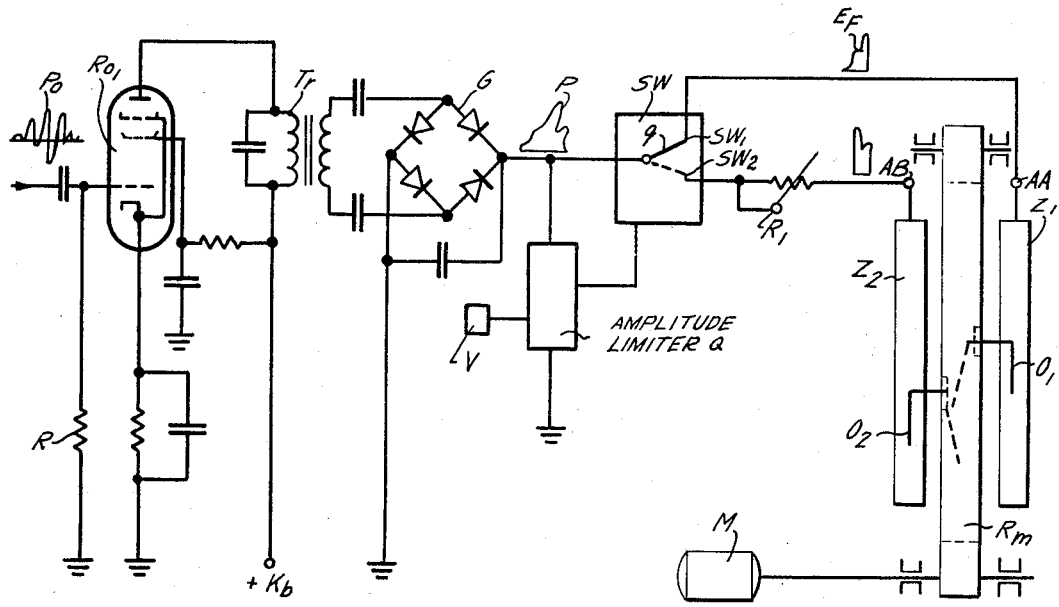
FIG. 3a shows schematically the circuit diagram of an embodiment of a sonar recording system according to the invention equipped with a recording instrument operating with two styli.
Figure 3B:
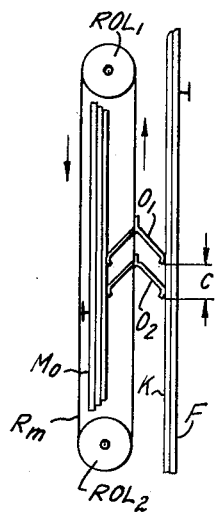
FIG. 3b is a schematic view, in side elevation, of the recording instrument.

Referring to the circuit diagram and recording instrument shown in FIGS. 3a and 3b, said instrument is equipped with two styli.

The pulse train $P_0$ arriving from the receiving transformer and having already passed through several amplifying stages in the echo signal amplifier, is constituted by a train of oscillations having a frequency of 30 kc. (kilocycles per second), for example. This pulse train passes through an RC-member to the control grid of amplifier tube $Ro_1$. Connected in the anode circuit of tube $Ro_1$ is a parallel resonance circuit which is conductively coupled to a rectifier G. The rectified pulse train P passes through a switching device SW to a tape recorder. The recorder has an endless belt $R_m$ supported by two rollers $RoL_1$ and $RoL_2$. The belt $R_m$ is driven by a motor M through the roller $RoL_2$ at uniform speed corresponding to the depth measuring range to which the apparatus is set at a time. Mounted on the belt $R_m$ are two stylus members $O_1$ and $O_2$ formed by respective spring wires of suitable shape. The two stylus members are spaced from each other a distance corresponding to the amount $c$ and travel on the same track across the current-sensitive paper tape K. The stylus wire $O_1$ elastically engages a current supply rail $Z_1$ and also the paper K which in turn travels along a fixed and grounded supporting plate F. The stylus wire $O_2$ is designed in the same manner and elastically engages a current supply rail $Z_2$ as well as the paper K. The two rails $Z_1$ and $Z_2$ are mutually insulated and secured to a mounting structure $M_o$. The selector contacts $SW_1$ and $SW_2$ of the switching device SW are connected with the respective terminals AA and AB of the current supply rails $Z_1$ and $Z_2$. An adjustable resistor R1 is interposed between switch contact $SW_2$ and rail $Z_2$.

Figure 3C:
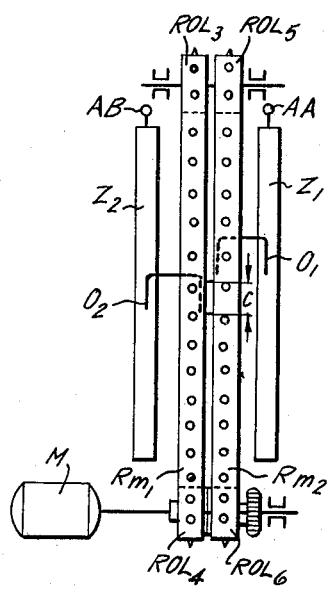
FIG. 3c illustrates schematically a modified recording instrument applicable in a system otherwise corresponding to FIGS. 3a and 3b.

In the modified embodiment of the recording instrument shown in FIG. 3c, an endless driving belt is provided for each of the two stylus members $O_1'$ and $O_2'$. The belts $R_{m1}$ and $R_{m2}$ are supported by rollers $RoL_3$, $RoL_4$ and $RoL_5$ and $RoL_6$. The rollers have sprocket teeth engaging corresponding sprocket holes in the belts. Rollers $RoL_3$ and $RoL_5$ run idle and are rotatable freely relative to each other. The driving roller $Ro_4$ is fixed to its driving shaft. The driving roller $RoL_6$ is rotatable on the same shaft and can be fixedly secured thereto with the aid of a clamping nut in threaded engagement with the drive shaft. This permits adjusting the position of the stylus members relative to each other so that the distance $c$ can be set at will.

The apparatus operates as follows:

When the switching device SW in FIG. 3a is in the illustrated condition, the writing current flows through terminal A, rail $Z_1$ and stylus $O_1$ through the recording paper K and the backing plate F to ground. The stylus member $O_1$ is then energized through the switching path of contact $SW_1$, to record the echoes of reflectors, for example fish close to the sea bottom (corresponding to the curve portion $E_F$ in FIG. 2). When, during appearance of a bottom echo, the writing current in the amplitude limiter Q exceeds the threshold value $J_A$, the amplitude limiter Q acts upon the switching device SW through control member $q$ to open the switching path $SW_1$ and connect the rectifier G with the switching path $SW_2$, this being indicated in FIG. 3a by a broken-line position of $q$. Now the stylus member $O_2$ passes the writing current through the paper K and records the bottom-echo pulse according to curve portion $E_B$ in FIG. 2. The resistor $R_1$ (FIG. 3a) permits adjusting the intensity of the writing current for recording the bottom-echo pulse $E_B$, independently of the amplification gain regulation of the echo signal amplifier. In this manner, the resistor $R_1$ permits adjusting the blackening of the paper for bottom-echo recording to a value not damaging to the paper.

While the switching device SW is shown only schematically, it will be understood that an electronic switching device, such as a transistor circuit, is preferably used. The switching speed $\Delta T$ of the switching device SW can be kept so short, that is, approximately 10 $\mu$s., that no noticeable loss of information content occurs when the device switches from $SW_1$ to $SW_2$. The amplitude limiter Q is provided with a regulating or adjusting member V by means of which the point A on the curve $E_F$–$E_B$ (FIG. 2) can be adjusted, for example by hand. This affords placing the switching moment at a desired point of the curve $E_F$–$E_B$ so that the leading flank of the bottom echo $E_B$ is recorded in connection with the previously recorded fish echoes, or that the leading flank of the bottom echo is completely suppressed in the upper portion $a$ of the echogram (FIG. 1) if this is desired, in which case the point A (FIG. 2) is to be placed at the end of curve $E_F$.

The just-mentioned possibility of setting the point A to a desired location further affords adapting the recording of the bottom echo $E_B$ in portion $a$ of the echogram to the up-and-down movements of the sonar-carrying vessel in rough sea. That is, when these vertical motions of the vessel are slight, as is the case when the sea is fairly calm, the demarkation line of the sea bottom can thus be recorded somewhat more intensively, whereas when the vertical motion of the vessel is larger, and hence in heavy sea, the apparatus may be set so that the bottom echo is only weakly or not recorded at all.

Figure 4:
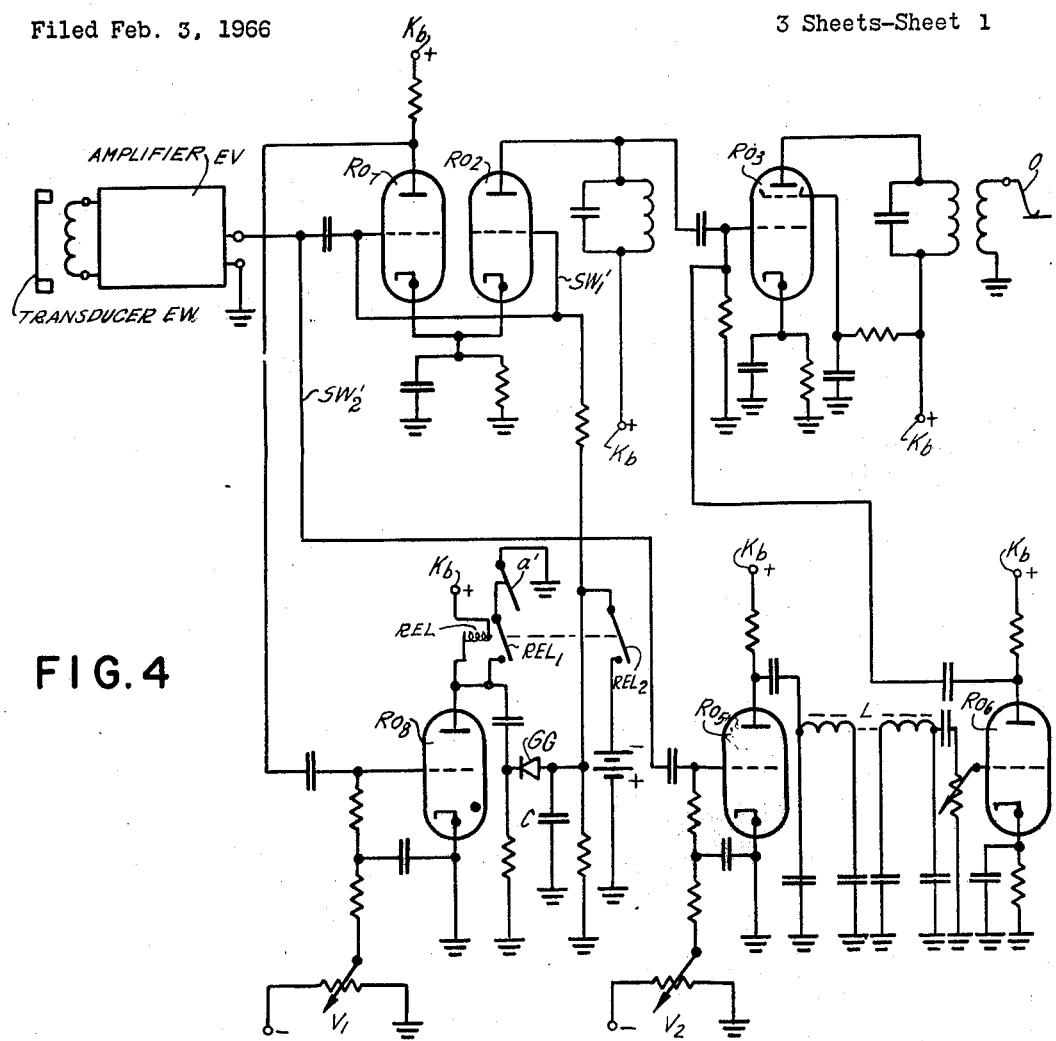
FIG. 4 is the circuit diagram of another sonar recording system according to the invention.

The circuit diagram shown in FIG. 4 relates to a system equipped with an echograph operating with a single stylus member which is denoted by O (right upper corner of FIG. 4). The switching device with its two current paths SW₁ and SW₂' is constituted by electronic tubes. The path SW₁' which is to carry only the fish echoes comprises a tube $Ro_2$, a parallel resonance (tank) circuit connected to the anode of the tube $Ro_2$, and another amplifying tube $Ro_3$ whose anode circuit contains a tank circuit inductively coupled with the writing circuit leading to the stylus O. It will be understood that the stylus point is in contact with the electrically sensitive recording paper backed by a grounded metal plate as described with reference to FIGS. 3a, 3b. The second path SW₂' comprises a tube $Ro_5$ which is negatively biased to pass only echo amplitudes exceeding a threshold value. Further connected in the second path SW₂' is a delay network L for delaying the travel time of the bottom-echo pulses, and a tube $Ro_6$ whose anode circuit is coupled through a capacitor with the control grid of the tube $Ro_3$. Both switching paths SW₁' and SW₂' are connected to the output of the echo signal amplifier EV to receive pre-amplified echo pulses. The input circuit of the amplifier EV is connected to the receiving sonar transducer EW. In this circuit arrangement, the tube $Ro_7$ and the tube $Ro_8$ conjointly operate as a switching device, corresponding in function to the switching device SW of FIG. 3a. The tube $Ro_8$ is a grid-controlled gas-discharge tube.

The apparatus according to FIG. 4 operates as follows.

The ultimate amplifying stage of the echo signal amplifier EV furnishes rectified and amplified echo signals which pass through tube $Ro_7$ to tube $Ro_8$ whose grid is negatively biased so that the tube $Ro_8$ is fired only by echo signals, such as the bottom echo, whose amplitude exceeds an adjusted threshold value within an interval $\Delta T$ of down to about 5 $\mu$s. duration. When the tube $Ro_7$ is being fired, a negative grid bias for the tubes $Ro_8$ and $Ro_2$ is produced through a rectifier diode GG, and the latter two tubes are turned off. The switching path SW₁' possesses some amount of delayed response by virtue of the circuit components (L, C member) connected in this path, so that upon arrival of the bottom echo the tube $Ro_8$ is fired and the tubes $Ro_7$, $Ro_2$ are blocked before the tube $Ro_3$ has reached a sufficiently high plate voltage to cause any writing on the recording paper.

The switching path SW₂' extends through tube $Ro_5$, time delay chain L and tube $Ro_6$. Tube $Ro_5$, by virtue of its negative grid bias, has such a threshold value, that no fish echoes are amplified in this tube, Thus the tube $R_5$ amplifies only the bottom echo, since, and to the extent, its intensity exceeds the threshold value. The bottom echo is delayed in time delay chain L by one or several milliseconds, depending upon the particular depth range to which the apparatus is set. Consequently, no writing appears on the recording paper during the interval of delay while the driving belt and the stylus continue to move. As a result, the vacant space c will remain between the portion a and the portion b of the echogram as exemplified in FIG. 1.

The anode circuit of the tube $Ro_8$ comprises the coil REL of a relay. After firing of the tube $Ro_8$ and after a negative pulse through the rectifier GG has interrupted the switching path SW₁ by blocking the tubes $Ro_1$ and $Ro_2$, the relay coil REL closes relay contacts $REL_1$ and $REL_2$, whereafter the relay coil holds itself energized through the self-holding contact $REL_1$. The relay contact $REL_2$ now places a negative potential, in lieu of the negative pulse potential, upon the grids of tubes $Ro_7$ and $Ro_2$, the pulse potential remaining at the capacitor C a sufficient time to prevent interruption of the negative grid bias. The delay chain L remains connected in the switching path SW₂' until a dog mounted on the driving belt $R_m$ (FIGS. 3a and 3b) opens a spring contact $a'$ (FIG. 4) when a new sonar pulse is being issued. After opening of the contact $a'$, the tube $Ro_8$ returns to its starting condition. Care must be taken that the threshold voltages, taken from respective potentiometers at $v_1$ and $v_2$ for respective tubes $Ro_8$ and $Ro_5$ are suitably adjusted. When the two latter tubes simultaneously respond at point A (FIG. 2), the curve B'D' of the bottom echo is recorded a distance c away from the recording EF of the fish echoes. The point A (FIG. 2) may be shifted within narrow limits by actuating the rheostat slider or knob of potentiometer $v_1$.

While in the embodiment shown in FIG. 4 the time delay member L is constituted by an electrical chain network, various other time delay means are known and available for this purpose of the invention. Applicable, for example, is a magnetophone device, such as a magnetizable tape or disc, in which the echo signals are magnetically entered upon the tape or disc and, after some amount of motion of the tape or disc, and read out by means of a reader head and are supplied to the grid of the tube $Ro_3$. Upon read-out, the echo recordings are cleared from the tape or disc.

The tape travel speed or the rotational speed of the magnetizable disc is changed when switching the apparatus to a different depth range in order to obtain substantially equal distances c on the echogram for respectively different ranges of depth. When using a chain network of the type shown in FIG. 4, the network is preferably provided with a number of taps in order to switch correspondingly different portions of the delay chain into the circuit for different ranges of depth.

With an echograph circuitry as shown in FIG. 4, difficulty may be encountered with respect to the required simultaneous response of the tubes $Ro_8$ and $Ro_5$. Furthermore, only relatively limited ranges are available for adapting the recording of the bottom-echo line in portion a of the echogram (FIG. 1) to vertical movements of the sonar-carrying vessel in heavy sea. Another disadvantage may be seen in the fact that in the switching path SW₂' only the portion of the echo amplitude located above the threshold of response for tube $Ro_5$, that is, the curve portion EB (FIG. 2), is recorded.

These shortcomings, however, are fully eliminated by the preferred embodiment of the apparatus of the invention illustrated in FIG. 5 and hereinafter described.

The echo pulse train $P_o$ coming from a preceding amplifying stage of the echo signal amplifier, without being demodulated, is again amplified in the illustrated amplifying stage comprising the tube $Ro_1$ (FIG. 3). The tank circuit $Tr_1$ in the anode circuit of the tube is inductively coupled with the control or switching paths $SSW_1$ and $SSW_2$ which lead to the respective control grids of amplifier tubes $Ro_9$ and $Ro_{10}$. The switching device SSW is constituted by a flip-flop, fromed by a bistable multivibrator which comprises tubes $Ro_{11}$ and $Ro_{12}$. The limiter or discriminator is formed by a diode stage D which is likewise inductively coupled to the tank circuit $Tr_1$. The switching of the pulse train $P_o$ from path $SSW_1$ to path $SSW_2$ can commence only after the signal amplitudes of the pulse train $P_o$ have gone beyond the point A (FIG. 2) which is adjusted by means of the threshold control rheostat $vv$ connected to the diode D. The amplitudes of the pulse train $P_o$ located beyond the point A and hence corresponding to the bottom echo EB (FIG. 2), produce a negative voltage pulse at the resistor $R_2$. This voltage pulse is amplified with great steepness in the tube $Ro_{13}$, thus assuming a steeper flank, and being reversed in polarity. The reversed steep and amplified pulse, appearing at the resistor $R_5$ is applied to the cathodes of the flip-flop tubes. By suitable choice of the resistance magnitudes and capacitances, the time constants in the tube circuits D, $Ro_{13}$ and in the flip-flop SSW can be kept so small that within the necessary interval of time, for example $\Delta T=10$ $\mu$s., the flip-flop will trigger from one stable condition to the other.

Prior to triggering, the flip-flop is in the following condition: The tube $Ro_{11}$ is turned off. A higher positive potential is impressed upon its anode than upon the anode of the tube $Ro_{12}$ which now conducts current. The anode potential of tube $Ro_{11}$ is applied through resistor $R_{14}$ to the grid of tube $Ro_9$ to act as positive control voltage. The automatic grid bias voltage of tube $Ro_9$ is so chosen that the tube $Ro_9$ is turned on and amplifies the echo pulse train $P_0$ when the grid is subjected to the voltage constituted by the difference between the automatic grid bias voltage and the positive control voltage. The amplified pulse train $P_0$ passes from tube $Ro_9$ through the tank circuit $Tr_2$ to a rectifier $G_1$ which demodulates the pulse train. The rectified pulse train then reaches the input terminal AA′ of one of the two stylus members $O_1$ of the recording instrument and causes writing upon the current-sensitive paper.

The anode potential at tube $Ro_{12}$ is lower than that at tube $Ro_{11}$, since tube $Ro_{12}$ conducts current. The anode potential of tube $Ro_{12}$ is applied through resistor $R_{13}$ to the grid of tube $Ro_{10}$. The difference voltage between the automatic grid bias voltage of tube $Ro_{10}$ and the positive control voltage applied to this grid from the anode of tube $Ro_{12}$ is negative to such an extent as to block the tube $Ro_{10}$. Consequently, the path $SSW_2$ is closed to the echo pulse train $P_0$.

When now the flip-flop SSW, upon the bottom echo exceeding the threshold value $v$ at the discriminating limiter V, triggers and thus switches from path $SSW_1$, to path $SSW_2$, the anode potentials of the tubes $Ro_{11}$ and $Ro_{12}$ become reversed. Consequently, the positive control potential becomes smaller at the grid of tube $Ro_9$ and larger at the grid of tube $Ro_{10}$. This blocks path $SSW_1$ and opens path $SSW_2$. The pulse train $P_0$ is thus interrupted at point A (FIG. 2) within the interval $\Delta T$, for examples 10 $\mu$s.; and the pulse train which commences at point B (FIG. 2), namely the bottom echo EB and the subsequent echo signads, amplified in tube $Ro_{10}$ without noticeable loss of information content, passes through the parallel resonance circuit $Tr_3$ to the rectifier $G_2$ for demodulation, and thence through the adjustable resistor RA to the terminal AB′ of the second stylus member $O_2$.

In contrast to the system of FIG. 4, the recording operation in the system of FIG. 5 does not supply to the recording instrument only those amplitudes of the bottom echoes that exceed the sensitivity threshold, but rather supplies to the second stylus member $O_2$ all of the bottom-echo amplitudes uncut.

The resistor RA serves to limit the amplitudes of the writing current to a value at which the current-sensitive paper will not burn or become excessively carbonized. The resistor RA may be replaced by an amplitude clipper or limiter, for example a tube which automatically regulates the peaks of the writing current down to a value not damaging to the current-sensitive paper.

A system according to FIG. 5 relative to that of FIG. 4, offers the advantage that the recording of the bottom echo in portion $a$ of the echogram (FIG. 1), subsequent to the recording of echoes stemming from fish close to the sea bottom, can be readily adapted to the elevation movements of the sonar-carrying vessel in heavy sea. By manually turning the adjusting knob of the resistor $vv$ for the responding threshold of the diode D, the starting point A on the curve $E_F$–$E_B$ (FIG. 2) can be displaced at will in order to selectively set the point where switching from path $SSW_1$ to path $SSW_2$ is to occur. That is, by operaiton of the resistor adjustment at $vv$, the bottom echo line can be fully suppressed or only weakly recorded in heavy sea, but will be more intensively recorded under more favorable conditions, if this is desired. This elective regulation may also be effected autoamtically in such a manner that the vertical elevation motion of the vessel is used to provide a control voltage which regulates the adjustable resistor $vv$ in the manner described. For this purpose, an elastic slide contact may be mounted upon a pendulum and glide over a resistor connected in an electric circuit, thus changing potentiometricaly a voltage, that is, the control voltage just mentioned, tapped off the potentiometric resistor. When the deflections of the pendulum are large, the bottom echo line is recorded weakly by dots or not at all, but when the deflections of the pendulum are slight, the bottom echo is recorded by lines of short length, and when the pendulum is at standstill a greater length of the recording lines for the bottom echo is maintained.

The adjustable resistor $R_2$ permits adjusting or regulating the response of the flip-flop SSW. Whenever a new transmitter pulse is being issued, the flip-flop acts directly or through the sonic-electric transducer submerged in the water, upon the receiver and further through the discriminating limiter upon the cathode resistor $R_6$ of the flip-flop SSW. This triggers the flip-flop back to its starting condition in which the flip-flop is ready to receive a new train of echo pulses.

The circuitry of FIG. 5, like that of FIG. 4, may also be employed for operation with only one stylus member in lieu of the two styli $O_1$, $O_2$ shown in FIG. 5. In the latter case, the second stylus member $O_2$ is eliminated and a delay chain LL is connected between the terminals BB′ and AA′, some other time delay means being also applicable as explained above. In FIG. 5, the delay chain LL is shown selectively connectable to the terminal BA′ by means of a switch SS which when placed in the illustrated position disconnects the chain LL and instead connects the second stylus $O_2$ to the resistor RA, whereas when the position of the selector switch SS is changed (as shown by broken lines), the stylus $O_2$ is disconnected and the delay chain LL inserted between the remaining one stylus $O_1$ and the resistor RA.

The forward conducting direction of the delay chain LL is fixed by insertion of a crystal diode $G_3$ or an equivalent amplifying tube as is shown in FIG. 4.

The invention may also be embodied in various circuit combinations other than those illustrated and described above. For example, the method of recording the bottom echo in dependence upon the surface condition of the sea, this bottom echo to appear beneath the recordings of reflector echoes, may also be employed in conjunction with otherwise known sonar recording methods that permit recording reflector echoes distinct from a bottom-echo recording in the form of a bright line involving a loss of information content.

Upon a study of this disclosure such and other modifications will be apparent to those skilled in the art and it should therefore be understood that our invention may be given embodiments other than illustrated and described herein, without departing from the essential features of our invention and within the scope of the claims annexed hereto.

We claim:

1. Sonar apparatus for recording sea-bottom echoes and distinctly therefrom the echoes from reflectors, such as schools of fish, above the bottom, comprising receiving means for converting echo pulses to signal voltage pulses;

a chart recorder having stylus means and drive means for repeatedly moving said stylus means along parallel recording tracks during respective sonar cycle periods, said stylus means comprising two stylus members having each of said recording tracks in common and being movable together with each other and spaced a constant distance from each other lengthwise of said tracks electric circuit means connecting said receiving means to said stylus means for controlling said stylus means to produce recording marks along said tracks under control by said voltage pulses;

control means interposed between said receiving means and said stylus means for controlling said stylus means to discontinue producing said marks said constant distance along said respective tracks, said control means comprising selector switch means having two output paths connected to said two stylus members respectively; and discriminating means connected to said receiving means for response to occurrence in each cycle period of voltage pulse intensities above a given minimum value higher than corresponds to said reflector echoes, said control means being connected to and controlled by said discriminating means to switch said receiving means from one to the other of said paths for causing said stylus means to discontinue and thereafter resume recording in dependence upon response of said discriminating means whereby the subsequently high-intensity echoes appear spaced a constant distance from the precedingly recorded reflector echoes on the chart.

2. Sonar apparatus as claimed in claim 1 wherein said recorder comprises an endless belt and a constant speed motor in driving connection with said belt, said two stylus members being fixed to said belt and spaced said distance from each other lengthwise of said belt.

3. Sonar apparatus as claimed in claim 2 wherein, said recorder comprises two mutually insulated contact rails electrically connected in said respective two paths, and each of said stylus members comprising a spring structure having a stylus point and forming an elastic slider engaging one of said respective rails.

4. Sonar apparatus as claimed in claim 1, wherein said recorder comprises endless belts and a pair of coaxial idling rollers and a pair of coaxial drive rollers, each belt being supported by one roller of each pair and joined with one of said respective stylus members, a constant speed drive having a drive shaft common to said pair of drive rollers, one of said drive rollers being rotationally adjustable relative to the other, and setting means for securing said drive rollers together so as to mutually space said two stylus members in accordance with said distance.

5. Sonar apparatus as claimed in claim 1, wherein said control means comprises an electronic switching device having an electronic switching amplifier connected to said discriminating means and triggered by an echo pulse intensity above said minimum value, a bistable flip-flop having an input connected to said switching amplifier and triggered from one to the other of its stable states and having two outputs connected to said stylus means for selectively passing the echo signal from said signal amplifier through one of said respective paths depending upon the state of said flip-flop.

6. Sonar apparatus as claimed in claim 5, wherein said electronic switching amplifier comprises a tube having a steep characteristic for issuing an amplified steep-flank control pulse of inverted polarity upon receipt of a negative bottom-echo pulse from said discriminator, and said flip-flop comprises two electronic members having a common cathode resistor connected to said control pulse for triggering said flip-flop.

7. Sonar apparatus as claimed in claim 5, further comprising two amplifier tubes having respective plate circuits connected to said stylus means and having respective control grid circuits connected to said two flip-flop outputs whereby one of said respective amplifier tubes is conductive in one of said paths at a time, and respective rectifier means connected between said two plate circuits and said stylus means.

8. Sonar apparatus for recording sea-bottom echoes and distinctly therefrom the echoes from reflectors, such as schools of fish, above the bottom, comprising receiving means for converting echo pulses to signal voltage pulses;

a chart recorder having stylus means and drive means for repeatedly moving said stylus means along parallel recording tracks during respective sonar cycle periods, said stylus means having a stylus member;

electric circuit means connecting said receiving means to said stylus means for controlling said stylus means to produce recording marks along said tracks under control by said voltage pulses;

control means interposed between said receiving means and said stylus means for controlling said stylus means to discontinue producing said marks a constant distance along said respective tracks, said control means comprising selector switch means having two output paths connected to said stylus member for switching said receiving means from one to the other of said paths and a time delay member interposed in said other of said paths whereby upon switching to said other of said paths said stylus member remains inactive a given interval of time while moving said constant distance along its track; and discriminating means connected to said receiving means for response to occurrence in each cycle period of voltage pulse intensities above a given minimum value higher than corresponds to said reflector echoes, said control means being connected to and controlled by said discriminating means to switch said receiving means from one to the other of said paths for causing said stylus means to discontinue and thereafter resume recording in dependence upon response of said discriminating means, whereby the subsequently high-intensity echoes appear spaced a constant distance from the precedingly recorded reflector echoes on the chart.

9. Sonar apparatus for recording sea-bottom echoes and distinctly therefrom the echoes from reflectors, such as schools of fish, above the bottom, comprising receiving means for converting echo pulses to signal voltage pulses;

a chart recorder having stylus means and drive means for repeatedly moving said stylus means along parallel recording tracks during respective sonar cycle periods;

electric circuit means connecting said receiving means to said stylus means for controlling said stylus means to produce recording marks along said tracks under control by said voltage pulses;

control means interposed between said receiving means and said stylus means for controlling said stylus means to discontinue producing said marks a constant distance along said respective tracks; and discriminating means connected to said receiving means for response to occurrence in each cycle period of voltage pulse intensities above a given minimum value higher than corresponds to said reflector echoes, said control means being connected to and controlled by said discriminating means for causing said stylus means to discontinue and thereafter resume recording in dependence upon response of said discriminating means, whereby the subsequently high-intensity echoes appear spaced a constant distance from the precedingly recorded reflector echoes on the chart, said discriminating means comprising an amplifier tube and a gas discharge tube, said amplifier tube having a plate circuit and having a grid coupled to the output of said signal amplifier, said gas discharge tube having a load circuit and having a control grid connected to said plate circuit and fired by the leading flank of an amplified bottom-echo pulse, a first and a second signal path connecting the output of said signal amplifier to said stylus means and comprising respective amplifying means, said amplifying means of said first path having conjointly with the grid of said amplifier tube a control circuit connected to the load circuit of said gas discharge tube to receive therefrom a blocking pulse by firing of said gas discharge tube, a source of blocking bias, said load circuit having relay means for connecting said source to said control circuit to block said first path by applying blocking bias in response to said blocking pulse.

10. Sonar apparatus as claimed in claim 9, wherein said second path comprises a time delay member, and said stylus means has a stylus member connected to both of said paths.

11. Sonar apparatus as claimed in claim 9, wherein said relay means comprises a self-holding circuit having a normally closed contact, and said recorder has means for opening said contact to cause blocking of said second path and readying of said first path.

12. Sonar apparatus for recording sea-bottom echoes and distinctly therefrom the echoes from reflectors, such as schools of fish, above the bottom, comprising receiving means having an echo signal amplifier for converting echo pulses to signal voltage pulses;

a chart recorder having stylus means and drive means for repeatedly moving said stylus means along parallel recording tracks during respective sonar cycle periods;

electric circuit means connecting said receiving means to said stylus means for controlling said stylus means to produce recording marks along said tracks under control by said voltage pulses;

control means interposed between said receiving means and said stylus means for controlling said stylus means to discontinue producing said marks a constant distance along said respective tracks; and discriminating means connected to said receiving means for response to occurrence in each cycle period of voltage pulse intensities above a given minimum value higher than corresponds to said reflector echoes, said control means being connected to and controlled by said discriminating means for causing said stylus means to discontinue and thereafter resume recording in dependence upon response of said discriminating means whereby the subsequently high-intensity echoes appear spaced a constant distance from the precedingly recorded reflector echoes on the chart, said discriminating means having an adjustable threshold member for setting said minimum value of pulse intensity, and said control means and said discriminating means being connected to the output of said echo signal amplifier, said discriminating means having control means varying said minimum value of echo pulse intensity in dependence upon changes in surface conditions of the sea.

References Cited

UNITED STATES PATENTS

| | | | |
|---|---|---|---|
| 3,072,882 | 1/1963 | Beebe | 340—3 |
| 3,098,210 | 7/1963 | Sparling et al. | 340—3 |

FOREIGN PATENTS

| | | |
|---|---|---|
| 812,638 | 4/1959 | Great Britain. |

RICHARD A. FARLEY, Primary Examiner